(12) United States Patent
Li et al.

(10) Patent No.: US 8,183,803 B2
(45) Date of Patent: May 22, 2012

(54) BRUSHLESS DC MOTOR CONTROL SYSTEM

(75) Inventors: Tiecai Li, Shenzhen (CN); Zhaoyong Zhou, Shenzhen (CN); Yamei Qi, Shenzhen (CN); Xiang Kong, Shenzhen (CN); Shuang Wang, Shenzhen (CN); Pinghua Tang, Shenzhen (CN)

(73) Assignee: Shenzhen Academy of Aerospace Technology, Shenzhen (CN)

( * ) Notice: Subject to any disclaimer, the term of this patent is extended or adjusted under 35 U.S.C. 154(b) by 427 days.

(21) Appl. No.: 12/565,763

(22) Filed: Sep. 24, 2009

(65) Prior Publication Data

US 2010/0270957 A1     Oct. 28, 2010

(51) Int. Cl.
    *H02P 6/00*     (2006.01)
(52) U.S. Cl. ............... 318/400.01; 318/400.29; 318/801
(58) Field of Classification Search .................. 318/139, 318/293, 400.01, 400.29, 400.38, 599, 701, 318/727, 801; 363/17, 40, 42, 55, 98, 171, 363/172, 174; 324/207.2, 610
    See application file for complete search history.

(56) References Cited

U.S. PATENT DOCUMENTS

| | | | | |
|---|---|---|---|---|
| 5,815,391 A | * | 9/1998 | Pelly | 363/98 |
| 6,404,655 B1 | * | 6/2002 | Welches | 363/41 |
| 6,834,407 B2 | * | 12/2004 | Stephens | 8/158 |
| 7,193,408 B2 | * | 3/2007 | Cattaneo et al. | 324/117 R |
| 7,646,178 B1 | * | 1/2010 | Fradella | 322/46 |
| 7,855,527 B2 | * | 12/2010 | Goto et al. | 318/801 |
| 2008/0080106 A1 | * | 4/2008 | Mirafzal et al. | 361/42 |

* cited by examiner

*Primary Examiner* — Walter Benson
*Assistant Examiner* — Antony M Paul (57) ABSTRACT

The present invention relates to a control technology of a three-phase DC motor. In order to resolve a problem in the prior art that the good current closed-loop control has not been realized on a three-phase square-wave brushless DC motor, the present invention provides a brushless DC motor control system, wherein cathodes of freewheel diodes D1, D3 and D5 are independent of input terminals of their respective switch tubes and connected in parallel to a sampling coil L1, and anodes of freewheel diodes D4, D6 and D2 are independent of output terminals of their respective switch tubes and connected in parallel to a sampling coil L2. The present invention can use a single resultant current sensor to completely and continuously sample the three-phase current existing during the motor is on and performs current freewheel, and perform the continuous closed-loop control on the three-phase current with a single current closed-loop regulator, thereby increasing dynamic and static indexes of the motor significantly.

8 Claims, 8 Drawing Sheets

BRUSHLESS DC MOTOR CONTROL SYSTEM

FIELD OF THE PATENT APPLICATION

The present invention relates to a control technology of a three-phase DC motor, and more particularly to a brushless DC motor control system. The technical solution of the present invention is especially applicable to servo control for a three-phase square-wave brushless permanent-magnet DC motor.

BACKGROUND

A square-wave brushless permanent-magnet DC motor is such a special brushless DC motor that the phase current and air gap magnetic field are approximately a square wave or a trapezoidal wave. For the three-phase bipolar driven brushless DC permanent-magnet motor, its forward conduction angle of each phase winding is 120°, pausing for 60°, then being on again backward for 120°, again pausing for 60°, and going round and round. The current of each phase winding is discontinuous, which renders current closed-loop control to be very difficult. Therefore, the current closed-loop control is seldom employed in the control system of the traditional square-wave brushless DC permanent-magnet motor.

In the prior art, the current closed-loop control is carried out by always applying an instantaneous value of the phase current to the three-phase square-wave brushless DC motor. This technical solution needs three independent current sensors as well as three independent current regulators, rendering the control circuit thereof to be complicated, difficult to adjust and poorly reliable, which thus is rarely adopted in the industry. There is a technical solution that uses an instantaneous value of bridge arm current in the prior art to realize the current closed-loop control. However, this technical solution of current sampling only approximately samples the current due to neglecting a freewheel function of motor winding inductance. Because freewheel current forms internal circulation in an inverting circuit and the motor winding, the bridge arm (bus) cannot be sampled, thus the actual current that flows through the motor winding and produces the torque cannot accurately be fed back, and thus the accurate control on the torque cannot be realized. It can be seen that this technical solution may result in a great intolerable deviation, and thus it is used to monitor a limited value of the current only.

On the other hand, current closed-loop control, speed closed-loop control and position closed-loop control are usually all essential in a high-performance servocontrol system. However, the prior technology has not realized the good current closed-loop control on the three-phase square-wave brushless DC motor. Therefore, in exiting high-performance servo control system, an AC servomotor or a sine brushless permanent-magnet DC motor is usually employed instead of the square-wave brushless permanent-magnet DC motor, which makes the control system significantly more complicated and the overall cost stay high.

Chinese patent application no. 200720118089.7 discloses "a brushless DC motor control system and the inverting module thereof". In this application, the traditional inverting circuit is improved appropriately and a resultant current sensor is used to completely and continuously sample the three-phase current existing during the motor is on and performs current freewheel, thus the continuous closed-loop control can be performed on the three-phase current of the motor through a single current closed-loop regulator. However, the above-mentioned improvement is not a final and the simplest approach, and the present invention will make a further improvement based on it.

SUMMARY

Aiming at the above-mentioned drawbacks of the prior art, the present invention uses a simpler resultant current sensor to completely and continuously sample the three-phase current existing during the motor is in operation and performs current freewheel, so as to better apply the square-wave brushless permanent-magnet DC motor.

The object of the invention is to solve the above technical problems and provides a brushless DC motor control system, which comprises an inverting circuit for outputting the operational power supply to the three-phase motor, and a current sensor for detecting the working current of the three-phase motor; The inverting circuit includes switch tubes Q1, Q3 and Q5 connected with an upper bridge arm, switch tubes Q4, Q6 and Q2 connected with a lower bridge arm, and freewheel diodes D1, D2, D3, D4, D5 and D6 cooperating with each of the switch tubes.

The current sensor comprises two sampling coils L1 and L2 having the same number of turns, which are wound around the same iron core and a sensing element that outputs the current sensing result according to a magnetic flux change of the iron core is mounted on the iron core.

Cathodes of the freewheel diodes D1, D3 and D5 of the switch tubes Q1, Q3 and Q5 are independent of input terminals of their respective switch tubes and connected in parallel to a like terminal of the sampling coil L1, the sampling coil L1 is connected in series in the upper bridge arm, and the like terminal thereof is connected with an anode of a DC power supply;

Anodes of the freewheel diodes D4, D6 and D2 of the switch tubes Q4, Q6 and Q2 are independent of output terminals of their respective switch tubes and connected in parallel to an unlike terminal of the sampling coil L2, and the like terminal of the sampling coil L2 is connected with the lower bridge arm.

In the present invention, the sensing element for outputting the current sensing result may be a linear Hall element.

In the present invention, output voltage amplitude of the linear Hall element which is used as a current feedback signal is sent to a current regulator as; output of the current regulator is sent to a pulse modulation circuit; output of the pulse modulation circuit is sent to a commutation logic circuit; output of the commutation logic circuit is then sent to a front-end drive circuit; the front-end drive circuit then outputs a corresponding drive pulse signal to a control terminal of each of the switch tubes in the inverting circuit; and the inverting circuit outputs the operational power supply to the three-phase motor under control of the drive pulse signal.

Preferably, the system of the present invention further comprises a position sensor mounted on a rotating shaft of the DC motor; an output signal of the position sensor is sent to a position/speed interface circuit; the position/speed interface circuit outputs speed feedback voltage to a speed regulator, position feedback voltage to a position regulator, and a commutation position signal and a motor direction signal to the commutation logic circuit; the position regulator outputs a speed given signal to the speed regulator according to the position given voltage and the position feedback voltage; the speed regulator outputs a current given signal to the current regulator according to the speed given signal and the speed feedback voltage; the current regulator outputs a corresponding control signal to the pulse modulation circuit according to the current given signal and the current feedback signal from the linear Hall element; and the commutation logic circuit outputs a corresponding control pulse to the front-end drive circuit according to a pulse signal from the pulse width modulation circuit as well as the commutation position signal and the motor direction signal from the position/speed interface.

In the present invention, the square-wave brushless permanent-magnet DC motor can be either a stator coreless linear three-phase square-wave brushless permanent-magnet DC motor, or a stator coreless rotary three-phase square-wave brushless permanent-magnet DC motor.

It can be seen from the above-mentioned technical solution of the present invention resolves the problem that the good current closed-loop control has not been realized on the three-phase square-wave brushless DC motor in the art by appropriately improving the traditional inverting circuit and using a simpler resultant current sensor to completely and continuously sample the three-phase current existing during the motor is in operation and performs current freewheel, thus the continuous closed-loop control can be performed on the three-phase current of the motor through the single current closed-loop regulator. The technical solution of the present invention can significantly increase dynamic and static indexes of the motor. The three-phase square-wave brushless permanent-magnet DC motor servocontrol system of the present invention can be used in various numerical control systems, such as high-performance servo control systems like a numerical control machine, an automation production line and a robot, and has the advantages of low cost, high force index, and so on.

BRIEF DESCRIPTION OF THE DRAWINGS

The present invention will further be explained with reference to drawings and embodiments, in which

FIG. 4 is a schematic view of the operating state when the switch tubes Q1 and Q6 in FIG. 3 are on;

DETAILED DESCRIPTION

Figure 1:
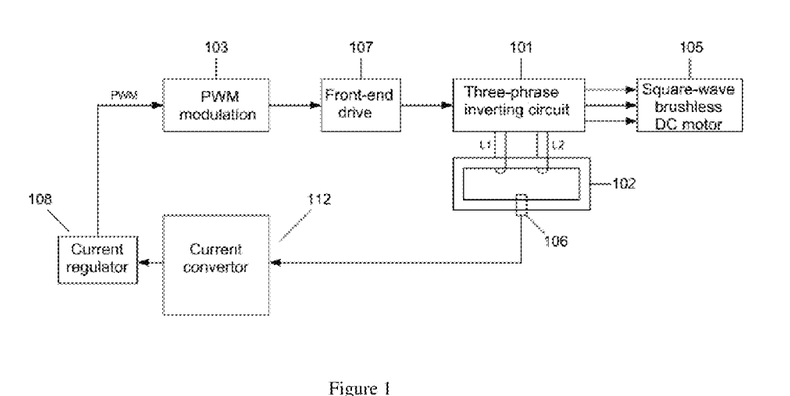
FIG. 1 is a functional block diagram of the servocontrol system of the three-phase square-wave brushless permanent-magnet DC motor in a preferred embodiment of the present invention.

A preferred embodiment of the present invention provides a servocontrol system of the three-phase square-wave brushless permanent-magnet DC motor, with the principle as shown in FIG. 1. Referring to FIG. 1, the control system comprises a three-phase bridge inverting circuit 101, a current sensor 102 connected with the inverting bridge circuit, a current converter 112 for converting a sensing signal of the current sensor, as well as a current regulator 108, a PWM modulation circuit 103 and a front-end drive circuit 107 connected sequentially. In this control system, the three-phase bridge inverting circuit 101 outputs the operational power supply to the three-phase square-wave brushless permanent-magnet DC motor 105. The current converter outputs the sensing signal via the linear Hall element 106.

Figure 2:
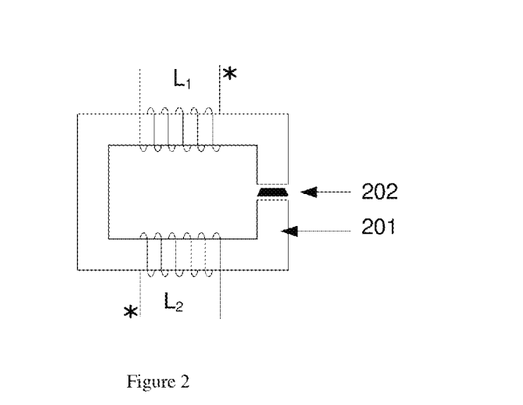
FIG. 2 is a structural schematic view of the current sensor in a preferred embodiment of the present invention.

In a preferred embodiment of the present invention as shown in FIG. 2, the current sensor includes two sampling coils L1 and L2 having the same number of turns, which are wound around the same iron core 201. On the iron core a sensing element, i.e. a linear Hall element 202, that outputs current sensing result according to the magnetic flux change of the iron core is mounted. A terminal with an asterisk (*) in the drawing is a like terminal of each of the sampling coils. It is obvious that the two sampling coils are wound around the iron core in the same direction. Therefore, what the linear Hall element in the current sensor detects is vector sum of the current in the two sampling coils.

The operating temperature of the linear Hall element is ranged from −45° to +125°. A change of vector sum of the current in the two sampling coils leads to a linear change of the output of the linear Hall element around a central value. When vector sum of the current in the two sampling coils is zero, the output of the linear Hall element 202 is ½ of its applied voltage; when vector sum of the current is more than zero, the output of the linear Hall element is increased linearly; and when vector sum of the current is less than zero, the output of the linear Hall element is decreased linearly. It can be derived from the description below that such a change shows magnitude and direction of the actual current of the brushless motor, and thus the present invention is effective to the current detection in four-quadrant operation of the brushless motor.

Figure 3:
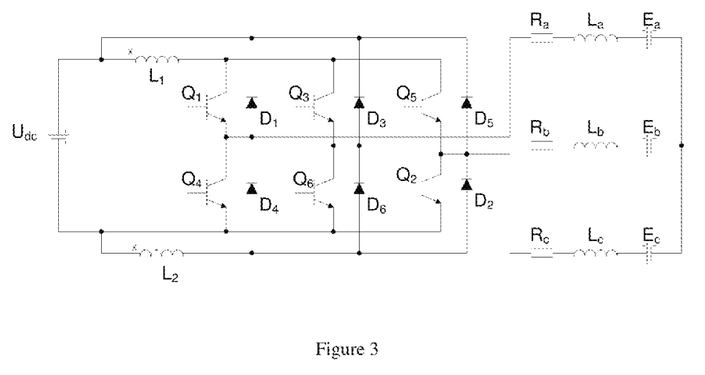
FIG. 3 is a schematic view of the inverting circuit in a preferred embodiment of the present invention.

In a preferred embodiment of the present invention as shown in FIG. 3, the inverting circuit comprises switch tubes Q1, Q3 and Q5 connected with an upper bridge arm, switch tubes Q4, Q6 and Q2 connected with a lower bridge arm, and freewheel diodes D1, D2, D3, D4, D5 and D6 cooperating with each of the switch tubes, respectively.

It can be seen from FIG. 3 that the cathodes of the freewheel diodes D1, D3 and D5 of the switch tubes Q1, Q3 and Q5 are independent of the input terminals of their respective switch tubes and connected in parallel to each other to a like terminal of the sampling coil L1. The sampling coil L1 is connected in series to the upper bridge arm, and the like terminal thereof is connected with an anode of a DC power supply. The anodes of the freewheel diodes D4, D6 and D2 of the switch tubes Q4, Q6 and Q2 are independent of the output terminals of their respective switch tubes and connected in parallel to each other to an unlike terminal of the sampling coil L2. A like terminal of the sampling coil L2 is connected with the lower bridge arm.

It is obvious that each of the sampling coils is wound around the iron core on one hand, and connected to the inverting circuit on the other hand. Inductance value of the sampling coils L1 and L2 is very small relative to the motor winding, thus the freewheel effect of its coil inductance can be neglected.

It can be seen from the description below that when the sampling coils L1 and L2 work normally, the current at any time only flows through one of the sampling coils, all entering the like terminal and exiting from the unlike terminal. Further in combination of a connection manner shown in FIG. 2, it is guaranteed that the current flowing into the like terminal of the two sampling coils L1 and L2 can produce the magnetic flux in the iron core in the same direction.

Figure 14:
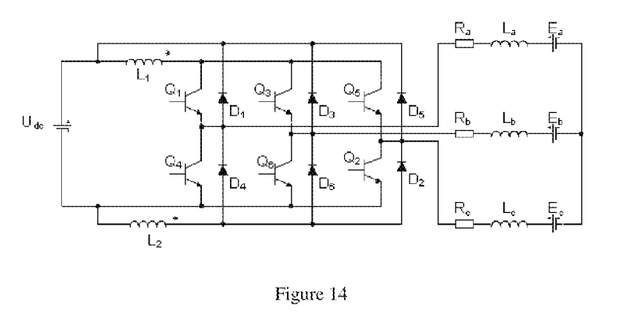
FIG. 14, FIG. 15 and FIG. 16 are other three kinds of inverting circuits diagrams derived from FIG. 3.

In the actual application, the sampling coils L1 and L2 in FIG. 3 can both be connected reversely, i.e. the like and the unlike terminals interchanged, which produces a circuit as shown in FIG. 14.

Figure 15:
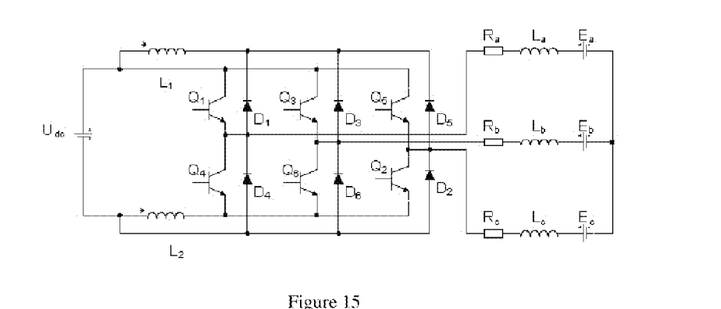

The connection methods of the sampling coils L1 and L2 can also be interchanged up and down, producing a circuit as shown in FIG. 15. The cathodes of the freewheel diodes D1, D3 and D5 are connected in parallel with each other to the unlike terminal of the sampling coil L1, whose like terminal is connected with the upper bridge arm. The anodes of the freewheel diodes D4, D6 and D2 are connected in parallel with each other to the like terminal of the sampling coil L2. The sampling coil L2 is connected in series to the lower bridge arm, and the like terminal thereof is connected with the cathode of the DC power supply.

Figure 16:
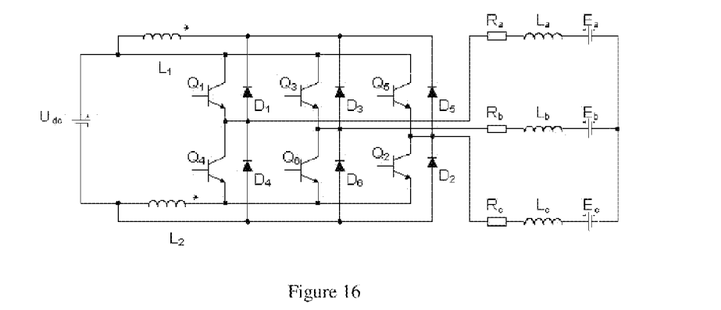

The sampling coils L1 and L2 in FIG. 14 can both be connected reversely, i.e. the like and the unlike terminals interchanged, which produces the circuit as shown in FIG. 16.

All the above-mentioned three transformations can guarantee that the current flowing into the like terminal of the two sampling coils L1 and L2 can produce the flux in the iron core in the same direction, thereby ensuring that what the linear Hall element in the current sensor detects is vector sum of the currents in the two sampling coils.

(1) Normal Situation, where the Current Only Flows Through the Sampling Coil L1

As for the upper bridge arm switch tubes Q1, Q3 and Q5 and the lower bridge arm switch tubes Q4, Q6 and Q2 in FIG. 3, when any group of the switch tubes is on, the current only flows through the sampling coil L1, and not through the sampling coil L2. In normal state this current is directly proportional to torque of the motor. In a non-normal state, e.g. Q1 and Q4 being connected directly, such a direct current can also be detected by the sampling coil L1, further realizing limitation or protection.

Figure 4:
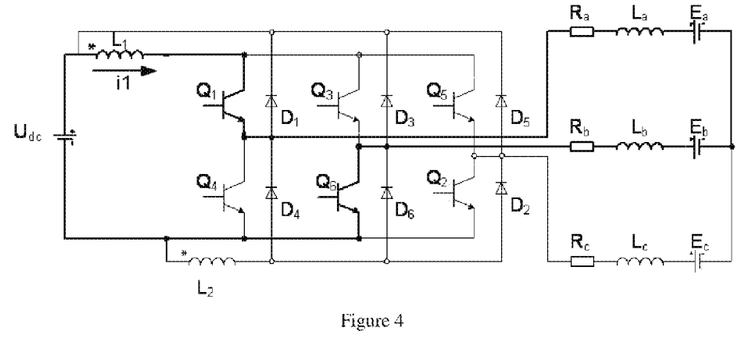

While working normally, a conduction group is obtained by any of the upper bridge arm switch tubes plus one of the lower bridge arm switch tubes having no direct connection with the former. As for the inverting circuit shown in FIG. 3, when the switch tubes Q1 and Q6 are connected, its current direction is as shown in FIG. 4 and represented with a heavy solid line. Here the current i1 enters into the like terminal of the sampling coil L1, and then flows sequentially through the switch tube Q1, a-phase winding of the motor, b-phase winding of the motor, and the switch tube Q6. It is obvious that the current here only flows through the sampling coil L1. Likewise, when Q1 and Q2 are connected, Q3 and Q4 are connected, Q3 and Q6 are connected, Q5 and Q4 are connected, and Q5 and Q6 are connected, the current only flows through the sampling coil L1, and not through the sampling coil L2. A circuit voltage equation here is as below:

$$U_{dc} = (L_1 + L_a + L_b)\frac{di_1}{dt} + (R_a + R_b)i_1 + E_a - E_b$$

(2) A Situation where the Modulation is Performed on the Upper Bridge Arm Switch Tube and the Current Only Flows Through the Sampling Coil L2

Figure 5A:
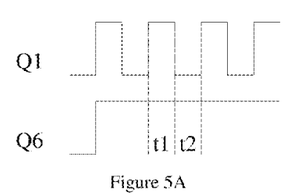
FIG. 5A is a pulse oscillogram when the PWM modulation is performed on the upper bridge arm switch tube Q1 in FIG. 4.
Figure 5B:
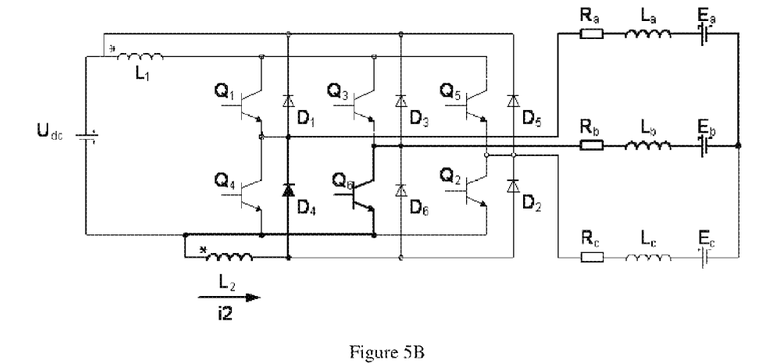
FIG. 5B is a schematic view of the operating state when the switch tube Q1 is switched off instantaneously and Q6 keeps on in FIG. 4.

As for the on state of the switch tubes Q1 and Q6 shown in FIG. 4, when the PWM modulation is performed on the switch tube Q1, control pulses of the two switch tubes are shown in FIG. 5A. After the switch tube Q1 is switched off (i.e. t2 in FIG. 5A), the current will not jump directly to zero because of the inductance of the motor winding, but perform current freewheel via a route shown in FIG. 5B and represented with a heavy solid line. It can be seen from the figure that freewheel current i2 flows into the like terminal of the sampling coil L2 through Q6, and then flows sequentially through the freewheel diode D4, the a-phase winding of the motor and the b-phase winding of the motor, thus forming a loop. Here the current flows through the sampling coil L2 and not through the sampling coil L1. Likewise, during an on cycle of any group of the switch tubes, if the PWN modulation is performed on the upper bridge arm switch tube, the freewheel current will only flow through the sampling coil L2 at the moment when the upper bridge arm switch tube is switched off, and not through the sampling coil L1. A circuit equation here is as below:

$$E_b - E_a = (R_a + R_b)i_2 + (L_a + L_b + L_2)\frac{di_2}{dt}$$

(3) A Situation where the Modulation is Performed on the Lower Bridge Arm Switch Tube and the Current Only Flows Through the Sampling Coil L1

Figure 5C:
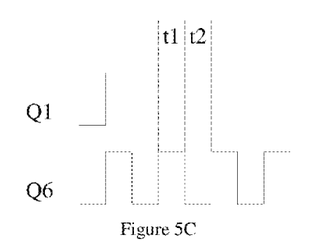
FIG. 5C is a pulse oscillogram when the PWM modulation is performed on the lower bridge arm switch tube Q6 in FIG. 4.
Figure 5D:
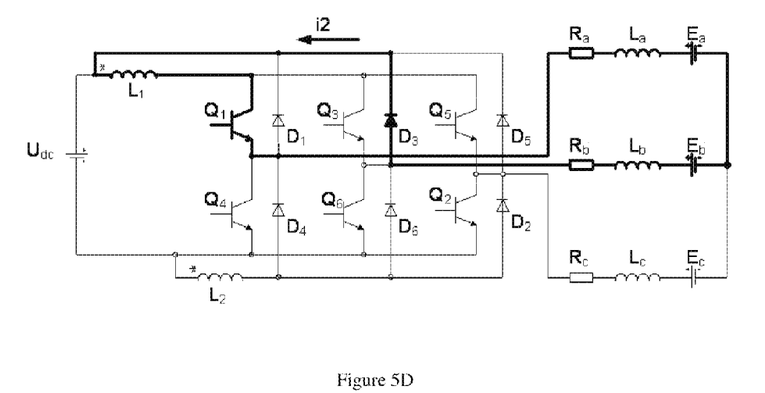
FIG. 5D is a schematic view of the operating state when the switch tube Q6 is switched off instantaneously and Q1 keeps on in FIG. 4.

As for the on state of the switch tubes Q1 and Q6 shown in FIG. 4, when the PWM modulation is performed on the switch tube Q6, the control pulses of the two switch tubes are shown in FIG. 5C. After the switch tube Q6 is switched off (i.e. t2 in FIG. 5C), the current will not jump directly to zero because of the inductance of the motor winding, but flow sequentially through Q1, the a-phase winding of the motor, the b-phase winding of the motor, and the freewheel diode D3, and return to Q1 through the like terminal of the sampling coil L1, thus forming a loop. As shown in FIG. 5D, the current here flows through the sampling coil L1, and not through the sampling coil L2. Likewise, during the on cycle of any group of the switch tubes, if the PWN modulation is performed on the lower bridge arm switch tube, the freewheel current will only flow through the sampling coil L1 at the moment when the lower bridge arm switch tube is switched off, and not through the sampling coil L2.

It can be seen from the above-mentioned three situations (1), (2) and (3) that this current sensor can detect both the current during the normal on period and the freewheel current during the PWM modulation. What the current sensor detects at any time is the actual current of the three-phase brushless permanent-magnet DC motor. The current sensor is applicable to any pulse modulation method, possessing universalness.

(4) Performing the PWM modulation only on the lower bridge arm switch tube

It can be seen from the above-mentioned third situation (3) that when the pulse width modulation is performed only on the lower bridge arm switch tube, the freewheel current only flows through the sampling coil L1, and not through the sampling coil L2. If this control method is always used, the current will flow through the sampling coil L1 during the normal on period, and also through the sampling coil L1 when the modulation is performed only on the lower bridge arm switch tube. Therefore, the sampling coil L2 in FIG. 2 can be omitted. Correspondingly, the freewheel diodes D4, D6 and D2 in FIG. 3 should be connected in a conventional way, that is, the anode of each of the freewheel diodes is connected to the output terminal of each of the switch tubes.

Figure 6:
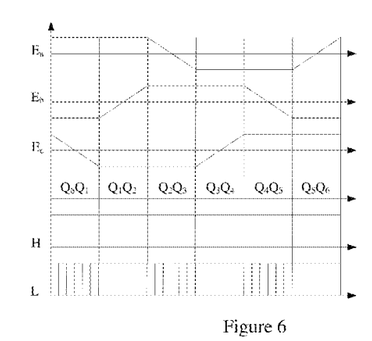
FIG. 6 is a schematic oscillogram when the PWM modulation is performed only on the upper bridge arm of the inverting circuit in FIG. 3.

It is obvious that the pulse width modulation can be performed only on the lower bridge arm switch tube in FIG. 3. A related waveform here is as shown in FIG. 6, wherein Ea, Eb and Ec are back electromotive force of the three windings of the motor, H is the drive pulse of the upper bridge arm switch tube, and L is the drive pulse of the lower bridge arm switch tube. In an embodiment shown in FIG. 6, although each of the lower bridge arm switch tubes has the conduction angle 120°, the PWM modulation is performed only on the latter 60° therein. In the actual application, the PWM modulation duration can also be increased or decreased.

(5) Performing the PWM Modulation Only on the Upper Bridge Arm Switch Tube

It can be seen from the above-mentioned second situation (2) that when the pulse width modulation is performed only on the upper bridge arm switch tube, the freewheel current only flows through the sampling coil L2, and not through the sampling coil L1. If this control method is always used, the current will flow through the sampling coil L1 during the normal on period and through the sampling coil L2 when the modulation is performed only on the upper bridge arm switch tube.

Figure 7:
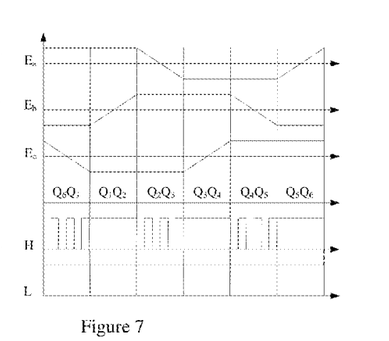
FIG. 7 is a schematic oscillogram when the PWM modulation is performed only on the lower bridge arm of the inverting circuit in FIG. 3.

It is obvious that the pulse width modulation can be performed only on the upper bridge arm switch tube in FIG. 3, which may obtain a waveform as shown in FIG. 7. In an embodiment as shown in FIG. 7, although each of the upper bridge arm switch tubes has the conduction angle 120°, the PWM modulation is performed only on the former 60° therein. In the actual application, the PWM modulation duration can also be increased or decreased.

(6) Performing the PWM Modulation on the Upper and Lower Bridge Arm Switch Tubes Simultaneously With reference to FIG. 3, since the two sampling coils L1 and L2 are provided in the circuit, the pulse width modulation can, during the on cycle of any group of the switch tubes, be performed first on the upper bridge arm switch tube and then on the lower bridge arm switch tube, or vice versa.

Figure 5E:
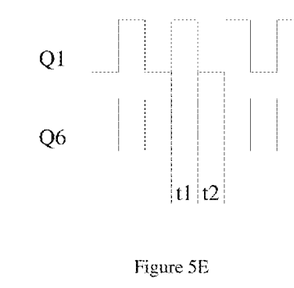
FIG. 5E is a pulse oscillogram when the PWM modulation is performed on the switch tubes Q1 and Q6 in FIG. 4.
Figure 5F:
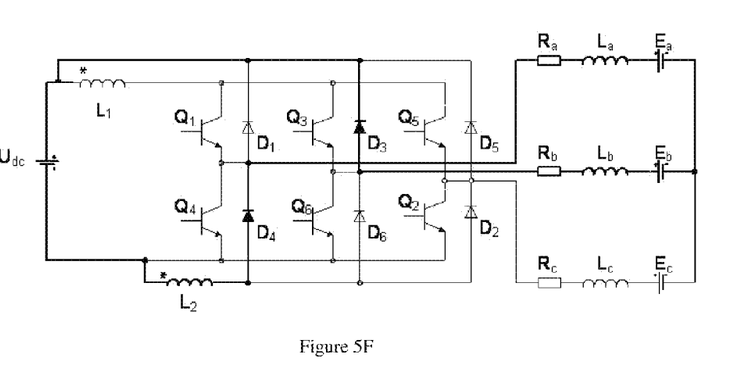
FIG. 5F is a schematic view of the operating state after the switch tubes Q1 and Q6 in FIG. 4 are switched off simultaneously.

During the modulation process, it is preferred to ensure that one of the switch tubes keeps on constantly while the pulse width modulation is performed on the other switch tube. If the modulation pulse shown in FIG. 5E is performed, the two switch tubes will be switched off simultaneously and a situation shown in FIG. 5F will be obtained. Referring to FIG. 5F, the freewheel current is obtained by making the diodes D3 and D4 on, and the current enters the like terminal of the sampling coil L2 after flowing through a power supply $U_{dc}$ (the DC power supply of battery nature or a capacitor connected in parallel with the power supply can be charged). It is obvious that the freewheel current flows through the sampling coil L2.

Figure 8:
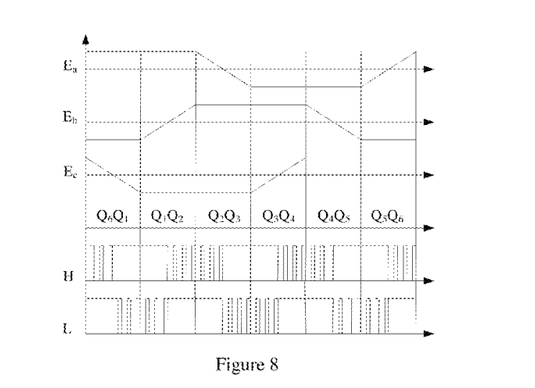
FIG. 8 is a schematic oscillogram when the PWM modulation is performed simultaneously on the upper and lower bridge arms of the inverting circuit in FIG. 3.

With reference to FIG. 3, it can be seen that the above-mentioned three situations (1), (2) and (3) may be derived from the circuit shown in FIG. 3, respectively. The waveforms in relation to above situations are illustrated in FIG. 8. In an embodiment as shown in FIG. 8, although each of the switch tubes has the conduction angle of 120°, the PWM modulation is performed only on the former 30° and the latter 30° thereof.

The embodiments of the three kinds of inverting circuits have been described above with reference to FIG. 3, FIG. 4 and FIG. 5. Furthermore, other three kinds of control methods (4), (5) and (6) can be applied to the embodiment shown in FIG. 3 simultaneously.

Figure 13:
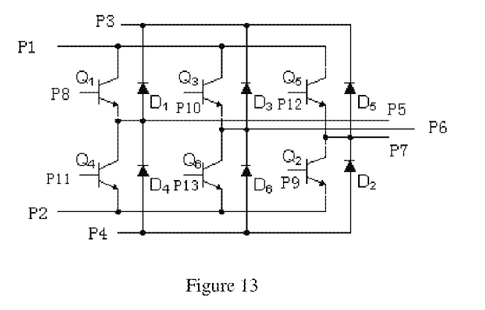
FIG. 13 is a circuit diagram of the inverting module derived from FIG. 3.

On the other hand, the circuit shown in FIG. 13 can be derived from the circuit shown in FIG. 3 after a peripheral element is removed. Then an integrated circuit (chip) is made of this circuit, thus producing an inverting module used for controlling the brushless DC motor in which the upper bridge arm and the lower bridge arm are connected to a first and a second pins P1 and P2, respectively. The cathodes of the freewheel diodes D1, D3 and D5 are independent of the input terminals of their respective switch tubes and connected in parallel to a third pin P3. The anodes of the freewheel diodes D4, D6 and D2 are independent of the output terminals of their respective switch tubes and connected in parallel to a fourth pin P4. The three output terminals of the inverting circuit are connected to a fifth, a sixth and a seventh pins P5, P6 and P7, respectively. Control terminals of the switch tubes Q1 to Q6 are connected to an eighth to a thirteenth pins P8-P13, respectively.

Figure 9:
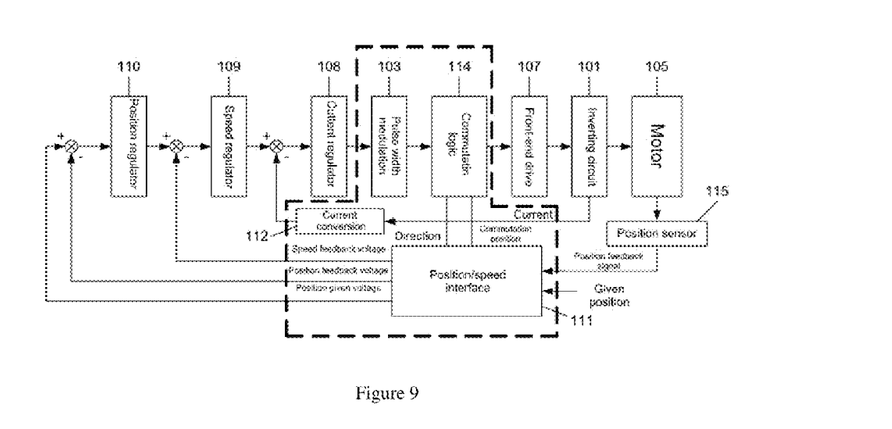
FIG. 9 is a functional block diagram of the position servocontrol system of the three-phase square-wave brushless permanent-magnet DC motor in a preferred embodiment of the present invention.

FIG. 9 is a functional block diagram of the position servo-control system of the three-phase square-wave brushless permanent-magnet DC motor in a preferred embodiment of the present invention. Referring to FIG. 9, the output voltage magnitude of the linear Hall element of the current sensor (not shown in the Figure) which is used as a current feedback signal is sent to the current regulator 108; output of the current regulator is sent to the pulse modulation circuit 103; output of the pulse modulation circuit is sent to the commutation logic circuit 104; output of the commutation logic circuit is then sent to the front-end drive circuit 107; the front-end drive circuit then outputs the corresponding drive pulse signal to the control terminal of each of the switch tubes in the inverting circuit 101; and the inverting circuit outputs the operational power supply to the three-phase motor 105 under control of the drive pulse signal.

In order to realize the position/speed closed-loop control, a position sensor 115 is mounted on the rotating shaft of the DC motor, whose output signal is sent to a position/speed interface circuit 111. The position/speed interface circuit outputs the speed feedback voltage to a speed regulator 109, the position feedback voltage to a position regulator 110, and a commutation position signal and a motor direction signal to a commutation logic circuit 114.

The position regulator 110 outputs a speed given signal to the speed regulator 109 according to the position given voltage (inputted from the lower right corner in the drawing) and the position feedback voltage. The speed regulator outputs a current given signal to the current regulator 108 according to the speed given signal and the speed feedback voltage. The current regulator outputs a corresponding control signal to the pulse modulation circuit 103 according to the current given signal and the current feedback signal from the linear Hall element. The commutation logic circuit 114 outputs a corresponding control pulse to the front-end drive circuit according to the pulse signal from the pulse width modulation circuit as well as the commutation position signal and the motor direction signal from the position/speed interface 111.

Figure 10:
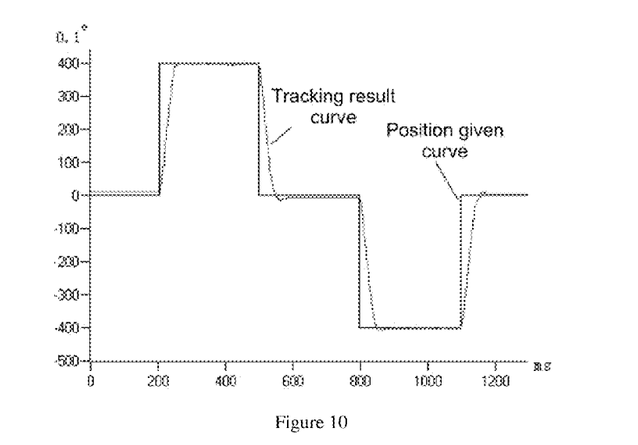
FIG. 10 is a step response waveform of the servocontrol system in FIG. 9.

In this embodiment, the position servocontrol of the three-phase square-wave brushless permanent-magnet DC motor is realized through the current regulator 108, the speed regulator 109 and the position regulator 110. The brushless permanent-magnet DC motor has the power of 150 W, the reduction ratio of 100:1, and the output torque of 15 N.m. FIG. 10 shows a step response waveform of the system, where the square wave is a position given curve and the other is a tracking result curve. When a given position has a step change, only 30-60 milliseconds are needed to realize the accurate tracking. Each time the given position has the step change, the two curves will quickly become coincident with each other, whereas its position tracking characteristic is very good.

In the actual application, the motor may be a stator coreless linear three-phase square-wave brushless permanent-magnet DC motor. Such a motor is advantageous to precise position servocontrol, because it has in principle the flatter phase current and the air gap magnetic field is approximately a square waveform, thereby having a flatter torque waveform.

In addition, the motor may also be a stator coreless rotary three-phase square-wave brushless permanent-magnet DC motor.

The position servocontrol system of the three-phase square-wave brushless permanent-magnet DC motor in the embodiment of the present invention, compared to the t position servo control system composed of an AC servomotor in the prior art, is greatly advantageous in the following aspects:
(a) Because the mean value of the square wave is bigger than that of a sine wave, the force index of the motor system of the present invention is increased by about 33%. This means that volume, weight and price of the motor can correspondingly be decreased by 33% for realizing the same function.
(b) The control circuit driven by the square wave is relatively simple, with the cost usually only being 50% of an AC servo system.
(c) The torque fluctuation index is equivalent, and will even be better especially when the stator coreless three-phase square-wave brushless permanent-magnet DC motor is adopted.
(d) The manufacturing cost of the square-wave brushless permanent-magnet DC motor is usually lower than that of the AC servomotor by about 30%.
(e) The position servocontrol system composed of the square-wave brushless permanent-magnet DC motor has better servo stiffness and dynamic response characteristics.

Figure 11:
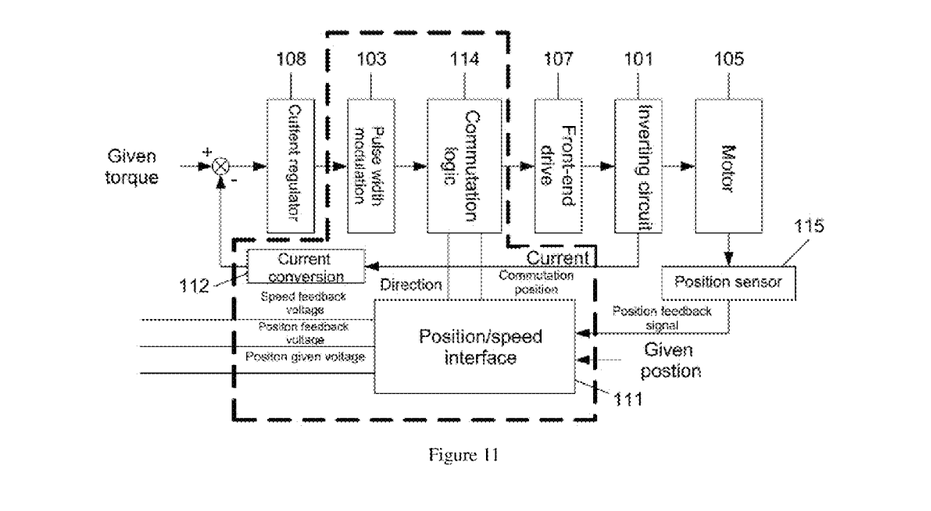
FIG. 11 is a functional block diagram of the torque servocontrol system of the three-phase square-wave brushless permanent-magnet DC motor in a preferred embodiment of the present invention.
Figure 12:
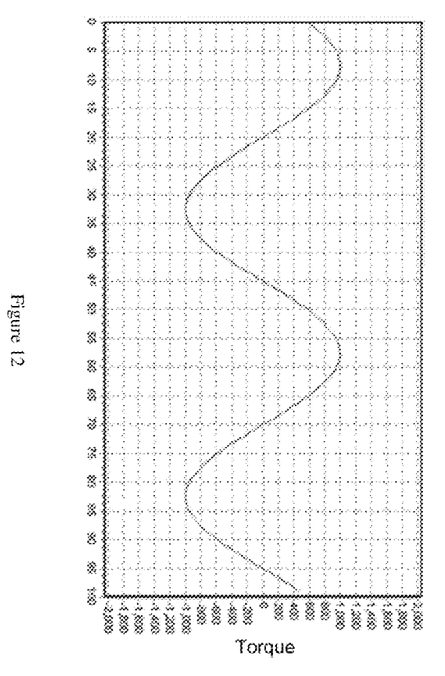
FIG. 12 is a schematic view of the torque in the system in FIG. 11.

FIG. 11 is a functional block diagram of the torque servocontrol system of the three-phase square-wave brushless permanent-magnet DC motor in a preferred embodiment of the present invention. It is different from FIG. 9 in that, no speed regulator or the position regulator is provided instead that a torque given signal is directly sent to the current regulator by the torque servo control system, thereby realizing the required torque control. In this embodiment, the stator coreless brushless permanent-magnet DC motor is adopted. Such a motor has the flatter torque waveform, because it has in principle the flatter phase current and the air gap magnetic field is approximately a square waveform. The motor has the nominal output torque of 0.1 Nm, and the nominal rotational speed of 6000 rpm. FIG. 12 is a torque tracking waveform of this torque control system, in which the given torque is a sine curve and the tracking result is also a smooth sine curve, both basically completely coincident with each other. It is obvious that its tracking characteristic is very good.

It can be seen from the above-mentioned embodiments that the present invention puts forward a new technical solution of performing the current closed-loop control on the square-wave brushless permanent-magnet DC motor, and can further constitute a high-performance servocontrol system. The present invention uses the single resultant current sensor to completely and continuously sample the three-phase current existing during the motor is on and performs current freewheel, and performs the continuous closed-loop control on the three-phase current with the single current closed-loop regulator, thus increasing the dynamic and the static indexes of the motor significantly. The high-performance servocontrol system composed of this square-wave brushless permanent-magnet DC motor can be used in various numerical control systems and, compared to popular systems applied in the present industry, has the cost decreased by 50% and the force index increased by 33%.

What is claimed is:
1. A brushless DC motor control system comprising an inverting circuit for outputting operational power supply to a three-phase motor and a current sensor for detecting working current of the three-phase motor, in which the inverting circuit comprises switch tubes Q1, Q3 and Q5 connected with an upper bridge arm, switch tubes Q4, Q6 and Q2 connected with a lower bridge arm and freewheel diodes D1, D2, D3, D4, D5 and D6 cooperating with each of the above switch tubes, respectively; wherein the current sensor comprises two sampling coils L1 and L2 that have the same number of turns and are wound around the same iron core, in which a sensing element that outputs current sensing result according to a magnetic flux change of the iron core is mounted on the iron core;
cathodes of the freewheel diodes D1, D3 and D5 of the switch tubes Q1, Q3 and Q5 are independent of input terminals of their respective switch tubes and connected in parallel to a like terminal of the sampling coil L1; and the sampling coil L1 is connected in series in the upper bridge arm, its like terminal being connected with an anode of a DC power supply; and
anodes of the freewheel diodes D4, D6 and D2 of the switch tubes Q4, Q6 and Q2 are independent of output terminals of their respective switch tubes and connected in parallel to an unlike terminal of the sampling coil L2, a like terminal of the sampling coil L2 being connected with the lower bridge arm.
2. A brushless DC motor control system comprising an inverting circuit for outputting the operational power supply to the three-phase motor, and a current sensor for detecting the working current of the three-phase motor, in which the inverting circuit comprises the switch tubes Q1, Q3 and Q5 connected with the upper bridge arm, the switch tubes Q4, Q6 and Q2 connected with the lower bridge arm, and the freewheel diodes D1, D2, D3, D4, D5 and D6 cooperating with each of the switch tubes;

wherein
the current sensor comprises two sampling coils L1 and L2 that have the same number of turns and are wound around the same iron core, in which a sensing element that outputs the current sensing result according to a magnetic flux change of the iron core is mounted on the iron core;
cathodes of the freewheel diodes D1, D3 and D5 of the switch tubes Q1, Q3 and Q5 are independent of the input terminals of their respective switch tubes and connected in parallel to an unlike terminal of the sampling coil L1; and the sampling coil L1 is connected in series in the upper bridge arm, its unlike terminal being connected with the anode of the DC power supply; and
anodes of the freewheel diodes D4, D6 and D2 of the switch tubes Q4, Q6 and Q2 are independent of the output terminals of their respective switch tubes and connected in parallel to the like terminal of the sampling coil L2, the unlike terminal of the sampling coil L2 being connected with the lower bridge arm.

3. A brushless DC motor control system comprising an inverting circuit for outputting the operational power supply to the three-phase motor, and a current sensor for detecting the working current of the three-phase motor, in which the inverting circuit comprises switch tubes Q1, Q3 and Q5 connected with the upper bridge arm, the switch tubes Q4, Q6 and Q2 connected with the lower bridge arm, and the freewheel diodes D1, D2, D3, D4, D5 and D6 cooperating with each of the switch tubes; wherein
the current sensor comprises two sampling coils L1 and L2 that have the same number of turns and are wound around the same iron core, in which a sensing element that outputs the current sensing result according to a magnetic flux change of the iron core is mounted on the iron core;
cathodes of the freewheel diodes D1, D3 and D5 of the switch tubes Q1, Q3 and Q5 are independent of the input terminals of their respective switch tubes and connected in parallel to the unlike terminal of the sampling coil L1, the like terminal of the sampling coil L1 being connected with the upper bridge arm; and
anodes of the freewheel diodes D4, D6 and D2 of the switch tubes Q4, Q6 and Q2 are independent of the output terminals of their respective switch tubes and connected in parallel to the like terminal of the sampling coil L2; and the sampling coil L2 is connected in series in the lower bridge arm, its like terminal being connected with a cathode of the DC power supply.

4. A brushless DC motor control system comprising an inverting circuit for outputting the operational power supply to the three-phase motor and a current sensor for detecting the working current of the three-phase motor, in which the inverting circuit comprises switch tubes Q1, Q3 and Q5 connected with the upper bridge arm, switch tubes Q4, Q6 and Q2 connected with the lower bridge arm, and freewheel diodes D1, D2, D3, D4, D5 and D6 cooperating with each of the switch tubes; wherein
the current sensor comprises two sampling coils L1 and L2 that have the same number of turns and are wound around the same iron core, in which a sensing element that outputs the current sensing result according to a magnetic flux change of the iron core is mounted on the iron core;
cathodes of the freewheel diodes D1, D3 and D5 of the switch tubes Q1, Q3 and Q5 are independent of the input terminals of their respective switch tubes and connected in parallel to the like terminal of the sampling coil L1, the unlike terminal of the sampling coil L1 being connected with the upper bridge arm; and
anodes of the freewheel diodes D4, D6 and D2 of the switch tubes Q4, Q6 and Q2 are independent of the output terminals of their respective switch tubes and connected in parallel to the unlike terminal of the sampling coil L2; and the sampling coil L2 is connected in series in the lower bridge arm, its unlike terminal being connected with the cathode of the DC power supply.

5. The brushless DC motor control system according to any one of claims 1 to 4, wherein the sensing element for outputting the current sensing result is a linear Hall element.

6. The brushless DC motor control system according to claim 5, wherein output voltage amplitude of the linear Hall element used as a current feedback signal is sent to a current regulator;
output of the current regulator is sent to a pulse modulation circuit;
output of the pulse modulation circuit is sent to a commutation logic circuit;
output of the commutation logic circuit is then sent to a front-end drive circuit;
the front-end drive circuit then outputs a corresponding drive pulse signal to a control terminal of each of the switch tubes in the inverting circuit; and
the inverting circuit outputs the operational power supply to the three-phase motor under control of the drive pulse signal.

7. The brushless DC motor control system according to claim 6, further comprising a position sensor being mounted on a rotating shaft of the DC motor, which output signal is sent to a position/speed interface circuit, in which the position/speed interface circuit outputs speed feedback voltage to a speed regulator, position feedback voltage to a position regulator, and a commutation position signal and a motor direction signal to the commutation logic circuit; wherein
the position regulator outputs a speed given signal to the speed regulator according to position given voltage and the position feedback voltage; the speed regulator outputs a current given signal to the current regulator according to the speed given signal and the speed feedback voltage; and the current regulator outputs a corresponding control signal to the pulse modulation circuit according to the current given signal and the current feedback signal from the linear Hall element; and
the commutation logic circuit outputs a corresponding control pulse to the front-end drive circuit according to a pulse signal from a pulse width modulation circuit as well as the commutation position signal and the motor direction signal from the position/speed interface.

8. The brushless DC motor control system according to claim 7, wherein the square-wave brushless permanent-magnet DC motor is a stator coreless linear three-phase square-wave brushless permanent-magnet DC motor, or a stator coreless rotary three-phase square-wave brushless permanent-magnet DC motor.

* * * * *